United States Patent
Schuh et al.

(10) Patent No.: US 10,858,549 B2
(45) Date of Patent: Dec. 8, 2020

(54) REPOSITIONABLE, MOISTURE-CURING ADHESIVE TAPE

(71) Applicant: TESA SE, Norderstedt (DE)

(72) Inventors: Christian Schuh, Hamburg (DE); Olga Kirpicenok, Ellerbek (DE); Yvonne Querdel, Ahrensburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 16/096,224

(22) PCT Filed: Apr. 18, 2017

(86) PCT No.: PCT/EP2017/059154
§ 371 (c)(1),
(2) Date: Oct. 24, 2018

(87) PCT Pub. No.: WO2017/186528
PCT Pub. Date: Nov. 2, 2017

(65) Prior Publication Data
US 2019/0144717 A1    May 16, 2019

(30) Foreign Application Priority Data
Apr. 26, 2016   (DE) .................. 10 2016 207 075

(51) Int. Cl.
| | | |
|---|---|---|
| *C09J 163/00* | (2006.01) | |
| *C08G 59/50* | (2006.01) | |
| *C09J 7/32* | (2018.01) | |
| *C08G 59/40* | (2006.01) | |
| *C08L 75/04* | (2006.01) | |
| *C09J 7/38* | (2018.01) | |
| *C09J 5/00* | (2006.01) | |
| *C09J 11/06* | (2006.01) | |
| *B32B 27/26* | (2006.01) | |
| *B32B 27/38* | (2006.01) | |

(52) U.S. Cl.
CPC ............ *C09J 7/32* (2018.01); *C08G 59/4014* (2013.01); *C08L 75/04* (2013.01); *C09J 5/00* (2013.01); *C09J 7/38* (2018.01); *C09J 11/06* (2013.01); *C09J 163/00* (2013.01); *C09J 2301/408* (2020.08); *C09J 2463/00* (2013.01); *C09J 2475/00* (2013.01)

(58) Field of Classification Search
None
See application file for complete search history.

(56) References Cited

U.S. PATENT DOCUMENTS

| | | | |
|---|---|---|---|
| 3,018,262 A | 1/1962 | Schroeder et al. | |
| 3,117,099 A | 1/1964 | Proops | |
| 3,661,923 A | 5/1972 | Emmons et al. | |
| 4,308,356 A | * 12/1981 | Emmons ............... | C08F 220/32 525/114 |
| 4,376,844 A | 3/1983 | Emmons et al. | |
| 4,576,999 A | 3/1986 | Eckberg | |
| 4,725,630 A | 2/1988 | Magee et al. | |
| 4,978,726 A | 12/1990 | Doehler et al. | |
| 5,304,419 A | 4/1994 | Shores | |
| 6,806,339 B2 | 10/2004 | Cray et al. | |
| 9,074,110 B2 | 7/2015 | Jauer et al. | |
| 2003/0143423 A1 | 7/2003 | McCormick et al. | |
| 2004/0236061 A1* | 11/2004 | Fujita .................. | C08G 59/4042 528/106 |
| 2010/0297357 A1* | 11/2010 | Mowrer ............... | C09D 163/00 427/407.1 |
| 2015/0184034 A1* | 7/2015 | Taniguchi ............. | C09J 133/08 428/41.5 |

FOREIGN PATENT DOCUMENTS

| | | |
|---|---|---|
| DE | 1952091 | 4/1970 |
| DE | 69228434 T2 | 11/1999 |
| EP | 0033515 B1 | 4/1984 |
| EP | 0253770 A1 | 1/1988 |
| EP | 0168713 B1 | 9/1991 |
| EP | 2025507 B1 | 12/2010 |
| EP | 2380930 A1 | 10/2011 |
| JP | 07-188634 A | 7/1995 |
| JP | H09328668 A | 12/1997 |
| JP | 2000-178455 A | 6/2000 |
| JP | 2014214265 A | 11/2014 |
| JP | 2017-071749 A | 4/2017 |
| WO | 2004009720 A2 | 1/2004 |
| WO | 2010022154 A2 | 2/2010 |
| WO | 2013174776 A1 | 11/2013 |

OTHER PUBLICATIONS

Translation of Office Action dated Oct. 10, 2019, in connection with Japanese Application No. 2018-555948.
German Search report for corresponding application DE 10 2016 204 075.4 dated Mar. 4, 2017.
International Search Report for corresponding application PCT/EP2017/059154 dated Jun. 30, 2017.

* cited by examiner

*Primary Examiner* — Michael J Feely
(74) *Attorney, Agent, or Firm* — Norris McLaughlin, P.A.

(57) ABSTRACT

The present invention relates to a pressure-sensitive adhesive tape comprising or consisting of a moisture-curing composition comprising or consisting of: A 5 to 60 parts by weight of at least one film-former component; B 40 to 95 parts by weight of at least one epoxide component; C 10 to 500 parts by weight of at least one moisture-activatable curing agent; D optionally 0.1 to 15 parts by weight of at least one stabilizer, and E optionally 0.1 to 200 parts by weight of at least one additive, based in each case on the moisture-curing composition, with the parts by weight of components A and B adding up to 100 and with the moisture-curing composition being characterized in that the moisture-activatable hardener C comprises or consists of at least one blocked amine. The invention further relates to a method for assembling two components using such adhesive tape.

18 Claims, No Drawings

REPOSITIONABLE, MOISTURE-CURING ADHESIVE TAPE

This application is a § 371 U.S. National stage of PCT International Patent Application No. PCT/EP2017/059154, filed Apr. 18, 2017, which claims foreign priority benefit of German Application No. DE 10 2016 207 075.4 filed Apr. 26, 2016, the disclosures of each of which patent applications are incorporated herein by reference.

The present invention relates to a pressure-sensitive adhesive tape, comprising or consisting of a moisture-curing composition comprising or consisting of:
- A  5 to 60 parts by weight of at least one film-forming component;
- B  40 to 95 parts by weight of at least one epoxide component;
- C  10 to 500 parts by weight of at least one moisture-activatable curing agent;
- D  optionally, 0.1 to 15 parts by weight of at least one stabilizer, and
- E  optionally, 0.1 to 200 parts by weight of at least one additive, based in each case on the moisture-curing composition, wherein the parts by weight of components A and B total 100. The invention further relates to a method for assembling two components by means of such an adhesive tape.

PRIOR ART

To a large extent, epoxide-based liquid adhesives are used for the structural bonding of components (for example in the automotive industry). These adhesives are applied using complex controlled dosing machines and have no initial bonding strength, so that the components must be maintained in position during the curing period.

In order to overcome this drawback, the method is known of using adhesive tapes having initial tackiness that maintain the components to be bonded in position immediately after bonding. These adhesive tapes are then subjected to a curing process in which they develop their final adhesive strength. The curing is triggered by means of an external initiator such as e.g. UV light or high temperatures. After such curing processes have been initiated, they can no longer be reversed or delayed, so that after assembly, the position of the component can no longer be corrected.

An epoxide liquid adhesive is known from U.S. Pat. No. 4,376,844 that can be stored in cartridges and poured out to form moisture-curing films. Polyoxazolidines are used as curing agents. According to the description in this document, these moisture-curing systems cure immediately when they are poured into a film in air. Consequently, it is not possible to produce storable adhesive tapes based on this chemistry.

JP 2014214265 A describes moisture-curing adhesive tapes, wherein the moisture-curing chemistry is based on silyl groups. In this case, cohesion-increasing polymers such as polyurethanes or acrylates are added to classic liquid adhesive compositions. A drawback of moisture crosslinking with alkoxysilane groups is the release of methanol and ethanol, which depending on the system and reactivity may be poisonous.

WO 2013174776 A1 discloses cyanoacrylate adhesive tapes that harden within 24 hours at 23° C. after being heated to 60° C. for one hour. The adhesive tape composition comprises 1 wt % of an acid as a stabilizer. Such adhesive tapes can only be stored under refrigeration. For this reason, the bonding performance of these adhesive tapes is tested in storage tests at 5° C. In such cyanoacrylate adhesives, it can be seen as a drawback that as a rule, they show poor temperature performance, as in the curing step, no chemically crosslinked polymer is produced, but only linear and thus meltable polymers. As a further drawback, one can mention the sensitivity of the reaction with respect to protic surfaces, which can prevent or at least hinder curing.

OBJECT OF THE INVENTION

The object of the invention is therefore to provide a storable moisture-curing adhesive tape of the above type, the curing mechanism of which is configured such that when two components are glued together with this adhesive tape, positional corrections of the bond or the glued components are possible within a period of at least 30 min after said components are assembled. Repositioning of the bond should preferably not cause any significant impairment of the final bonding strength compared to the same adhesive tape without repositioning.

Means for Achieving Object

The object is achieved by means of a pressure-sensitive adhesive tape, comprising or consisting of a moisture-curing composition, comprising or consisting of:
- A  5 to 60 parts by weight of at least one film-forming component;
- B  40 to 95 parts by weight of at least one epoxide component;
- C  10 to 500 parts by weight of at least one moisture-activatable curing agent;
- D  optionally, 0.1 to 15 parts by weight of at least one stabilizer, and
- E  optionally, 0.1 to 200 parts by weight of at least one additive, based in each case on the moisture-curing composition, wherein the parts by weight of components A and B total 100, wherein the moisture-curing composition is characterized in that the moisture-activatable curing agent C comprises or consists of at least one blocked amine.

The invention is based on the finding that by using blocked amines as the moisture-activatable curing agent C, the curing mechanism of an epoxide-based composition of the above type can be prolonged such that in use of the adhesive tape, detachment and rebonding of the adhesive tape is possible within a period of at least 30 min, in particular even within a period of 30 min to 12 h, and preferably within a period of 30 min to 24 h. In this case, repositioning of the bond within the above-mentioned periods does not cause any significant impairment of the final bonding strength compared to the same adhesive tape without repositioning.

It was therefore surprisingly found that, despite the limitations of the prior art (e.g. U.S. Pat. No. 4,376,844), storable pressure-sensitive films composed of moisture-curable epoxide adhesives can be provided that are repositionable despite the presence of humidity.

"Pressure-sensitive" or "self-sticking" adhesive substances are adhesive substances that allow a lasting bond with the adhesive base under relatively weak pressure and can be detached from the adhesive base after use essentially without leaving any residue. Within the meaning of the present invention, a pressure-sensitive adhesive tape has an adhesive strength in an uncured state of at least 1 N/cm. Here, the adhesive strength is determined on steel analogously to ISO 29862:2007 (Method 3) at 23° C. and 50% relative humidity with a peel rate of 300 mm/min and a peel angle of 180°. An etched PET film with a thickness of 36 µm, such as that available from the firm Coveme (Italy), is used as a reinforcing film. Bonding of a 2 cm wide measuring strip is carried out using a bending rolls machine with a force of 4 kg at a temperature of 23° C. The adhesive tape is peeled off immediately after application. The measurement value (in N/cm) is determined as the mean value of three individual measurements.

At room temperature, pressure-sensitive adhesive substances have a permanent pressure-sensitive action, i.e. they show sufficiently low viscosity and high initial tack, so that they moisten the surface of the respective adhesive base when only low pressure is applied. The bondability of the adhesive substances is based on their adhesive properties, and the detachability thereof is based on their cohesive properties.

DETAILED DESCRIPTION OF THE INVENTION

The (pressure-sensitive) adhesive tape according to the invention can preferably have no carrier or be provided with at least one carrier material. If a carrier material is present, this can be provided with a (pressure-sensitive) adhesive substance on one or preferably both sides that comprises or consists of the moisture-curing composition according to the invention. The carrier material comprises all films or film sections that are of the flat sheet type, for example those extended in two dimensions, tapes with an extended length and limited width, tape sections, punched blanks (for example in the form of borders or boundaries of an (opto) electronic device), multilayer devices, and the like. In this case, a wide variety of carriers, such as e.g. films, fabrics, nonwovens, and papers, can be combined with the adhesive substances for various applications.

All films or film sections that are of the flat sheet type, for example those extended in two dimensions, tapes with an extended length and limited width, tape sections, punched blanks (for example in the form of borders or boundaries of an (opto)electronic device), multilayer devices, and the like can be used as a carrier material. In this case, a wide variety of carriers, such as e.g. films, fabrics, nonwovens, and papers, can be combined with various adhesives.

In the present case, polymer films, film composites, or films or film composites provided with organic and/or inorganic layers are preferably used as carrier materials of the adhesive tape. Such films/film composites may be composed of all plastics commonly used for film production, and the following can be mentioned as non-limiting examples: polyethylene, polypropylene—in particular oriented polypropylene (OPP), produced by mono- or biaxial stretching, cyclic olefin copolymers (COC), polyvinyl chloride (PVC), polyesters—in particular polyethylene terephthalate (PET) and polyethylene naphthalate (PEN), ethylene vinyl alcohol (EVOH), polyvinylidene chloride (PVDC), polyvinylidene fluoride (PVDF), polyacrylonitrile (PAN), polycarbonate (PC), polyamide (PA), polyether sulfone (PES), or polyimide (PI).

In addition, the carrier can be combined with organic or inorganic coatings or layers. This can be carried out by means of common methods such as e.g. painting, printing, vapor deposition, sputtering, co-extrusion, or lamination. Here, one can mention as examples, which however are not limitative, oxides or nitrides of silicon and aluminum, indium tin oxide (ITO), or sol-gel coatings.

Moreover, the term "adhesive tape" also includes so-called "adhesive transfer tapes," i.e. adhesive tapes without a carrier. In the case of an adhesive transfer tape, the adhesive substance, which here corresponds to the adhesive tape, is in fact placed between flexible liners prior to application, said liners being provided with a separating layer and/or having anti-adhesive properties. For application, one routinely first removes one liner, applies the adhesive substance/adhesive tape, and then removes the second liner. The adhesive substance can thus be directly used for bonding of two surfaces. Such adhesive transfer tapes without a carrier are particularly preferred according to the invention. Such a pressure-sensitive adhesive without a carrier according to the invention allows bonding that is extremely precise in positioning and dosing.

At the end of the production process, pressure-sensitive adhesive tapes coated on one or both sides with adhesives are usually wound into a roll in the form of an Archimedean spiral. In order to prevent the adhesive substances from coming into contact with each other in the case of two-sided adhesive tapes or to prevent bonding of the adhesive substance to the carrier in the case of single-sided adhesive tapes, the adhesive tapes are covered prior to winding with a cover material (also referred to as a separating material) that is rolled up together with the adhesive tape. Such cover materials are known to the person having ordinary skill in the art as liners or release liners. In addition to covering of single- or double-sided adhesive tapes, liners are also used for covering pure adhesive substances (adhesive transfer tape) and adhesive tape sections (such as labels).

Moreover, these liners serve to prevent the adhesive substance from being soiled prior to use. A liner is not a component of an adhesive tape, but only an auxiliary for the production, storage, or processing thereof. In addition, the bond is only temporary and not permanent.

A liner according to the prior art is composed of at least one adhesive layer, also referred to as a "separating layer," in order to reduce the adhesive tendency of adhering products with respect to these surfaces (separating function). This layer can be applied to a carrier material.

Papers or films in particular can be used as a carrier material of the liner. In this case, one preferably uses as films those composed of biaxially stretched polyethylene terephthalate, polybutene, polypropylene, polyethylene, monoaxially stretched polypropylene, biaxially stretched polypropylene or polyethylene, particularly preferably polyolefin films (polypropylene and polyethylene films) or polyester films. Polymer-coated papers or nonwovens can also be used.

All systems known to the person having ordinary skill in the art can be used as a separating layer, in particular those mentioned in the "Handbook of Pressure Sensitive Adhesive Technology" by Donatas Satas (Satas & Associates, Warwick 1999). According to the prior art, the material of the adhesive separating layer is preferably selected from the group comprising silicones, fluorinated silicones, silicone copolymers, waxes, carbamates, fluoropolymers and polyolefins or mixtures of two of more of the above-mentioned substances.

Crosslinkable silicone systems are frequently used as a separating layer. These include mixtures of crosslinking catalysts and so-called thermally curable condensation- or addition-crosslinked polysiloxanes. For condensation-crosslinking silicone systems, tin compounds such as dibutyl tin diacetate are frequently present in the adhesive as crosslinking catalysts.

Addition-crosslinked silicone-based separating coatings can be cured by hydrosilylation. These separating systems ordinarily comprise the following components: an alkenylated polydiorganosiloxane (in particular linear polymers with terminal alkenyl groups), a polyorganohydrogen siloxane crosslinking agent, and a hydrosilylation catalyst.

Platinum or platinum compounds, such as e.g. Karstedt's catalyst [a Pt(0) complex compound], have proven to be effective as catalysts for addition-crosslinking silicone systems.

Moreover, photoactive catalysts, so-called photoinitiators, in combination with UV-curable cationically crosslinking siloxanes on an epoxide and/or vinyl ether basis or UV-curable radically crosslinking siloxanes such as e.g. acrylate-modified siloxanes, can also be used. The use of election-beam-curable silicone acrylates is also possible. Depending on the purpose of application, corresponding systems can also comprise further additives such as stabilizers or flow control agents.

Moreover, various types of organopolysiloxane adhesives that are crosslinked by heating or irradiation are also known. Examples include adhesives such as those described for example in DE 60001779 T2, which are crosslinked by means of an addition reaction, specifically by temperature treatment of a mixture of an organopolysiloxane with hydrogen atoms directly bonded to the silicon atoms and an organopolysiloxane with vinyl groups directly bonded to the silicon atoms in the presence of a hydrosilylation catalyst.

Photopolymerizable organopolysiloxane adhesives can also be used. Examples include for example adhesives that are crosslinked by means of the reaction between organopolysiloxanes having hydrocarbon radicals that are substituted with (meth)acrylate groups and are directly bonded to the silicon atoms in the presence of a photosensitizer (cf. EP 0168713 B1 or DE 3820294 C1). Adhesives in which the crosslinking reaction is induced between organopolysiloxanes having hydrocarbons that are substituted with mercapto groups and are directly bonded to the silicon atoms and organopolysiloxanes with vinyl groups directly bonded to the silicon atoms in the presence of a photosensitizer can also be used. Such adhesives are described for example in U.S. Pat. No. 4,725,630 A1.

For example, in use of the organopolysiloxane adhesives described in DE 3316166 C1, which have hydrocarbon radicals that are substituted with epoxy groups and bound directly to the silicon atoms, the crosslinking reaction is induced by the release of a catalytic amount of acid obtained by photodecomposition of added onium salt catalysts. Other organopolysiloxane adhesives that are curable by means of a cationic mechanism are materials having propenyl oxysiloxane end groups, for example.

Among the above-mentioned silicones, the addition-crosslinking silicones are of the greatest economic importance. However, an undesirable property of these systems is their sensitivity to catalyst poisons, such as e.g. heavy metal, sulfur, and nitrogen compounds (cf. "Chemische Technik, Prozesse and Produkte [Chemical Technology, Processes, and Products]" by R. Dittmeyer et al., Vol. 5, 5th Edition, Wiley-VCH, Weinheim, Germany, 2005, Chapter 6-5.3.2, pg. 1142). In general, electron donors can be viewed as platinum poisons (A. Colas, Silicone Chemistry Overview, Technical Paper, Dow Corning). Accordingly, phosphorus compounds such as phosphines and phosphites are also to be viewed as platinum poisons. The presence of catalyst poisons causes the crosslinking reaction of the various components of a silicone separating coating not to occur or to occur only to a minor extent. For this reason, the presence of contact poisons, in particular platinum poisons, is strictly avoided in the production of antiadhesive silicone coatings.

Such platinum poisons are listed in DE 102008027502. In a preferred embodiment of the invention, the getter material is not a platinum poison.

Particular embodiments of the silicone systems are polysiloxane block copolymers, e.g. with urea blocks, such as those sold by the firm Wacker under the brand name Geniomer, or separating systems composed of fluorosilicones, which are used in particular in adhesive tapes with silicone adhesives.

Waxes, fluorinated or partially fluorinated polymers or polyolefins, in particular polyethylene block copolymers, such as those disclosed in EP 2025507 B1 or WO 2010/022154 A2, and carbamates can further be used as the separating layer.

One can also work with adhesive tapes provided not with two liners, but with a single two-sided separating liner. In this case, the adhesive tape web is covered on its upper side with the one side of the two-sided separating liner and on its underside with the back side of the two-sided separating liner, in particular an adjacent turn on a ball or a roll.

The thickness of the pressure-sensitive adhesive substance, which is either in the form of an adhesive transfer tape or coated onto a flat sheet, is preferably between 1 µm and 2000 µm, further preferably between 5 µm and 1,000 µm, and particularly preferably between approximately 50 µm and 550 µm.

In order to bridge tolerances, layer thicknesses of between 300 µm and 700 µm are used for example in the automotive industry.

Layer thicknesses of between 1 µm and 50 µm reduce the amount of material used. However, this causes a reduction in adhesion to the substrate.

Film-Forming Component A

It is provided according to the invention that the moisture-curing composition comprises at least one film-forming component A. As a rule, any film-forming component known to the person having ordinary skill in the art for use in pressure-sensitive adhesive tapes can be used. As a rule, these are polymers such as those described for example in the "Handbook of Pressure Sensitive Adhesive Technology" by Donatas Satas (Satas & Associates, Warwick 1999).

Suitable for use as the film-forming component A are elastomers based on acrylates and/or methacrylates, polyurethanes, natural rubbers, synthetic rubbers such as butyl, (iso)butyl, nitrile, or butadiene rubbers, styrene block copolymers with an elastomer block composed of unsaturated or partially or fully hydrogenated polydiene blocks (polybutadiene, polyisoprene, poly(iso)butylene, copolymers thereof and further elastomer blocks known to the person having ordinary skill in the art), polyolefins, fluoropolymers and/or silicones.

If rubber, synthetic rubber, or blends produced therefrom are used as a base material for the adhesive substance, as a rule, the natural rubber may be of any available quality, such as the crepe, RSS, ADS, TSR, or CV types, depending on the level of purity and viscosity required, and the synthetic rubber or synthetic rubbers may be selected from the group of the statistically copolymerized styrene butadiene rubbers (SBR), butadiene rubbers (BR), synthetic polyisoprenes (IR), butyl rubbers (IIR), halogenated butyl rubbers (XIIR), acrylate rubbers (ACM), ethylene vinyl acetate copolymers (EVA), or polyurethanes and/or blends thereof.

Any type of thermoplastic known to the person having ordinary skill in the art can also be used as the film-forming component A, such as those mentioned for example in the textbooks "Chemie and Physik der synthetischen Polymere [Chemistry and Physics of Synthetic Polymers]" by J. M. G.

Cowie (Vieweg, Braunschweig) and "Makromolekulare Chemie [Macromolecular Chemistry]" by B. Tieke (VCH Weinheim, 1997). Although poly(ethylene), poly(propylene), poly(vinyl chloride), poly(styrene), poly(oxymethylenes), poly(ethylene oxide), poly(ethylene terephthalate), poly(carbonates), poly(phenylene oxides), poly(urethanes), poly(ureas), acrylonitrile-butadiene-styrene (ABS), poly (amides) (PA), poly(lactate) (PLA), poly(ether ether ketone) (PEEK), poly(sulfone) (PSU), poly(ether sulfone) (PES), poly(acrylates), poly(methacrylates), and poly(methyl methacrylates) (PMMA), for example, are also possible as polymers, they are not preferred within the meaning of the present invention.

The film-forming component A can preferably be chosen depending on the epoxide system selected. If polar epoxides are used (often produced by reaction of alcohols with epichlorohydrin, such as e.g. the reaction product of bisphenol A and epichlorohydrin), polar polymers in particular are preferred as the film-forming component A. These comprise both elastomers such as acrylonitrile-butadiene rubbers, in particular with a high acrylonitrile content of more than 25%, and thermoplastics such as poly(ethylene oxide), poly (ethylene terephthalate), poly(carbonates), poly(phenylene oxides), poly(urethanes), poly(ureas), poly(amides) (PA), poly(lactate) (PLA), poly(ether ether ketone) (PEEK), poly (sulfone) (PSU) and poly(ether sulfone) (PES).

For nonpolar epoxides, such as e.g. dicyclopentadiene diepoxide, nonpolar polymers are preferred as the film-forming component A. These comprise both elastomers such as acrylonitrile-butadiene rubbers, in particular with a low acrylonitrile content of less than 30%, or general nonpolar polymers such as poly(styrene), styrene block copolymers with an elastomer block composed of unsaturated or partially or fully hydrogenated polydiene blocks (polybutadiene, polyisoprene, poly(iso)butylene, copolymers thereof and further elastomer blocks known to the person having ordinary skill in the art) or thermoplastic polyolefins, fluoropolymers and/or silicones.

In order to obtain pressure-sensitive adhesive substances with particularly high epoxide contents, all polymers are particularly suitable for the film-forming component A that are not intrinsically pressure-sensitive, i.e. do not meet the Dahlquist criterion at room temperature (cf. J. Adhesion, 1991, Vol. 34, pp. 189-200 or C. A. Dahlquist: Tack, adhesion, fundamentals and practice, McLaren and Sons Ltd., London, 1966). This applies both to the film-forming component A per se and to the mixture of the film-forming component A and adhesive resin, provided that an adhesive resin is used. Therefore, although the film-forming component A and optionally the adhesive resin are not pressure-sensitive per se, the resulting adhesive substance of the adhesive tapes according to the invention is pressure-sensitive.

Particularly advantageous polymers for the film-forming component A in order to achieve extremely high bonding strengths are poly(amides), polyurethanes, acrylonitrile-butadiene rubbers and poly(ureas), poly(ether ether ketone) (PEEK), poly(sulfone) (PSU), and poly(ether sulfone) (PES).

When polyurethanes are used as the film-forming component A, these have been found to be particularly advantageous for favorable adhesive forces in an uncured state if the polyurethane is partially crystalline and on DSC measurement shows a melt or crystallization peak that corresponds to a melting enthalpy of at least 5 J/g, preferably 20 J/g, and particularly preferably 40 J/g.

The polymers of the film-forming component A can have a linear, branched, star-shaped, or grafted structure, to cite only a few examples, and may be configured as a homopolymer, a statistical copolymer, an alternating copolymer, or a block copolymer. The term "statistical copolymer" includes within the meaning of this invention not only copolymers in which the comonomers used in polymerization are incorporated in a purely statistical manner, but also those in which gradients in the comonomer composition and/or local accumulations of individual comonomer types in the polymer chains occur. Individual polymer blocks can be configured as (statistical or alternating) copolymer blocks.

In a particularly preferred embodiment, the polymer of the film-forming component A of the adhesive tape according to the invention is chemically crosslinked after coating and before use. Strictly speaking, therefore, the polymer is no longer an elastomer or thermoplastic after curing. This improves the adhesive properties in an uncured state.

In this case, chemical crosslinking of the polymer of the film-forming component A is preferably radiation-induced or is carried out by adding a crosslinking agent, wherein the crosslinking agent in particular comprises at least 2 reactive groups selected from the group consisting of isocyanates, alkoxysilanes, and alkyl halides, optionally with addition of a multifunctional (i.e. f>1) alcohol or amine with a molar mass M<10,000 g/mol. In this case, the functionality f refers to the average number of functional groups per molecule.

The film-forming component A is particularly preferably selected from elastomers and/or thermoplastics, in particular from nitrile rubber, synthetic rubber, natural rubber, polyurethanes, polyacrylates, polyamides or mixtures thereof, wherein the film-forming component A is preferably not intrinsically pressure-sensitive.

According to the invention, the moisture-curing composition comprises 5 to 60 parts by weight of the at least one film-forming component A, in particular 7.5 to 55 parts by weight, preferably 15 to 50 parts by weight, based in each case on the moisture-curing composition, wherein the parts by weight of components A and B total 100.

Epoxide Component B

As the epoxide component B, epoxide-containing materials or epoxide resins can be used, wherein these are any desired organic compounds with at least one oxirane ring that are polymerizable by means of a ring-opening reaction. Such materials, which are generally referred to as epoxides, comprise both monomeric and polymeric epoxides and can be aliphatic, cycloaliphatic, or aromatic. These materials generally have an average of at least two epoxide groups per molecule, and preferably more than two epoxide groups per molecule. The "average" number of epoxide groups per molecule is defined as the number of epoxide groups in the epoxide-containing material divided by the total number of epoxide molecules present. In addition to compounds with an oxirane ring, oxetanes, i.e. 4-membered ring compounds, can also be used.

The polymeric epoxides include linear polymers with terminal epoxide groups (e.g. a diglycidyl ether of a polyoxyalkylene glycol), polymers with scaffold oxirane units (e.g. polybutadiene-polyepoxide), and polymers with epoxide side groups (e.g. a glycidyl methacrylate polymer or copolymer). The molecular weight of the epoxide-containing material can vary from 58 to approximately 100,000 g/mol or more. Mixtures of different epoxide-containing materials can also be used in the hotmelt compositions of the invention. Useful epoxide-containing materials include those comprising cyclohexene oxide groups, such as the epoxycyclohexane carboxylates, exemplified by 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyhadipate. For a more detailed list of useful epoxides of this type, reference is made to U.S. Pat. No. 3,117,099.

Further epoxide-containing materials that are particularly useful in application of this invention comprise glycidyl ether monomers. Examples are the glycidyl ethers of polyvalent phenols obtained by reacting a polyvalent phenol with an excess of chlorohydrin, such as epichlorohydrin (e.g. the diglycidyl ether of 2,2-bis-(2,3-epoxypropoxyphenol)propane). Further examples of epoxides of this type that can be used in application of this invention are described in U.S. Pat. No. 3,018,262.

Numerous commercially available epoxide-containing materials can be used in this invention. Particularly suitable are epoxides that are readily available, such as octadecylene oxide, epichlorohydrin, styrene oxide, vinyl cyclohexene oxide, glycidol, glycidyl methacrylate, diglycidyl ethers of bisphenol A (e.g. those sold by Shell Chemical Co. under the brand names EPON 828, EPON 1004 and EPON 1001F and by Dow Chemical Co. under the brand names DER-332 and DER-334), diglycidyl ethers of bisphenol F (e.g. ARALDITE GY281 from Ciba-Geigy), vinyl cyclohexene dioxide (e.g. ERL-4206 from Union Carbide Corp.), 3,4-epoxycyclohexyl methyl-3,4-epoxycyclohexenecarboxylate (e.g. ERL-4221 from Union Carbide Corp.), 2-(3,4-epoxycyclohexyl-5,5-spiro-3,4-epoxy)cyclohexane-metadioxane (e.g. ERL-4234 from Union Carbide Corp.), bis(3,4-epoxycyclohexyl)adipate (e.g. ERL-4299 from Union Carbide Corp.), dipentene dioxide (e.g. ERL-4269 from Union Carbide Corp.), epoxidized polybutadiene (e.g. OXIRON 2001 from FMC Corp.), a silicone resin-containing epoxide functionality, epoxysilanes (e.g. β-(3,4-epoxycyclohexyhethyltrimethoxysilane and γ-glycidoxypropyltrimethoxysilane, commercially available from Union Carbide), flame-retardant epoxide resins (e.g. DER-542, a brominated bisphenol-like epoxide resin, available from Dow Chemical Co.), 1,4-butanediol diglycidyl ethers (e.g. ARALDITE RD-2 from Ciba-Geigy), hydrogenated bisphenol A-epichlorohydrin-based epoxide resins (e.g. EPONEX 1510 from Shell Chemical Co.), and polyglycidyl ethers of phenol formaldehyde-novolac (e.g. DEN-431 and DEN-438 from Dow Chemical Co.).

In a further embodiment of the adhesive tape according to the invention, the epoxide component B comprises at least 10 wt % of liquid epoxide resins at 25° C., based on the epoxide component B. In particular, the content of such liquid epoxide resins in the epoxide component B is 10 to 90 wt %, and further preferably 20 to 75 wt %. Adhesive tapes with such ratios of liquid to solid epoxide components show particularly balanced adhesion properties in an uncured state. If an adhesive tape with particularly favorable flow properties is desired, the content of liquid epoxide components is preferably 50 to 80 wt %. For applications in which the adhesive tapes must already withstand a higher load in an uncured state, a content of 15 to 45 wt % is particularly preferred. Such a resin, or also a mixture of various resins, can be used.

A measure of flowability is dynamic viscosity. In the present case, dynamic viscosity is determined in a cylinder rotational viscosimeter with a standard geometry according to DIN 53019-1 (2008-09). Viscosity is measured at a measurement temperature of 25° C. and a shear rate of $1 \times s^{-1}$. A fluid refers to a substance having a viscosity of less than 500 Pa·s.

The epoxide component B can have a mean functionality based on the alkylene oxide groups of at least 1.0 to 6.0, in particular 1.75 to 3.2, in order to achieve a high bonding strength. The network density can be reduced using reactive thinners, which leads to less fragile adhesive substances, in particular with high contents of the component B. Such reactive thinners typically have a functionality of 1.0. The network density is typically controlled by selection of the epoxide component and can be reduced by using higher-molecular-weight epoxides such as e.g. solid bisphenol A-diglycidyl ethers. Preferably, epoxide resins with an epoxy equivalent of more than 400 g/eq, in particular more than 800 g/eq, are also used.

The epoxy equivalent or the equivalent weight (EEW for epoxy-equivalent weight) indicates the amount of epoxide resin in [g] that possesses one equivalent [eq] of epoxide functions. It is calculated based on the molar mass in [g/mol] divided by the functionality fin [eq/mol]:

$$\text{EEW [g/eq]} = M \text{ [g/mol]}/f \text{ [eq/mol]}$$

Alternatively, concentration is also expressed in [m eq/kg] (sometimes also incorrectly described as [mmol/kg]) and in [%]. One epoxide group, i.e. 1 eq ($C_2H_3O$), is equivalent to 43 g, i.e. 1,000 m eq/kg of epoxide is equivalent to 43 g of epoxide/kg, and thus equal to 4.3%. The epoxy equivalent is given by raw material producers and is determined according to ISO 3001:1999.

According to a preferred embodiment of the adhesive tape according to the invention, the epoxide component B contains at least two different epoxide resins B1 and B2, of which a. the first epoxide resin B1 has a dynamic viscosity at 25° C. of less than 500 Pa*s, measured according to DIN 53019-1 at a measurement temperature of 25° C. and a shear rate of $1 \times s^{-1}$ and b. of which the second epoxide resin B2 has a softening temperature of at least 45° C. or a dynamic viscosity at 25° C. of at least 1000 Pa*s, measured according to DIN 53019-1 at a measurement temperature of 25° C. and a shear rate of $1 \times s_{-1}$, wherein in particular, the content of the first epoxide resin B1 is 10 to 90 wt %, preferably 20 to 75 wt %, and the content of the second epoxide resin B2 is 10 to 90 wt %, preferably 25 to 80 wt %, based on the epoxide component B.

The moisture-curing composition comprises according to the invention 40 to 95 parts by weight of at least one epoxide component B, in particular 45 to 92.5 parts by weight, preferably 50 to 85 parts by weight, based in each case on the moisture-curing composition, wherein the parts by weight of components A and B total 100.

Blocked Amine

It is provided according to the invention that the moisture-curing composition contains a moisture-activatable curing agent C that comprises or consists of at least one blocked amine.

In this present context, a blocked amine refers to compounds that release amines in the presence of water.

In a preferred embodiment of the adhesive tape according to the invention, the blocked amine is one comprising at least two amine hydrogen atoms after complete reaction with water in an unblocked state, as such compounds form thermally stable networks with epoxides that impart high bonding strengths to the adhesives. An amine hydrogen is understood to refer to a hydrogen atom that is directly covalently bonded to a nitrogen atom.

In the context of the present invention, the blocked amine is preferably selected from the group comprising or consisting of oxazolidines, imines, enamines, silyl amines or combinations thereof, wherein the blocked amine in particular is an oxazolidine. Major advantages of oxazolidines are their commercial availability, the high reactivity of the released amine, and the unobjectionable cleavage product that is additionally released in an unblocking step. It is therefore particularly preferable for the blocked amine to contain at least two oxazolidine groups.

In use of imines, in particular aldimines, it is advantageous to add a moisture-latent acid, selected in particular from alkenyl esters such as e.g. vinyl acetate, silyl ester or mixtures thereof. The amount of moisture-latent acid based on the amount of imine is in particular 0.001 to 0.15 mol of moisture-latent acid per mole of imine, and preferably 0.01 to 0.1 mol of moisture-latent acid per mole of imine.

According to the invention, the moisture-curing composition comprises 10 to 500 parts by weight, in particular 7.5 to 300 parts by weight, and preferably 5 to 250 parts by weight of the moisture-activatable curing agent C comprising or composed of the at least one blocked amine, based in each case on the moisture-curing composition.

The amount of blocked amine used is preferably selected such that there are 0.95-1.5 amine hydrogens of the released amine, in particular 0.98 to 1.2 amine hydrogens per epoxide group of the epoxide component B. The reason for this relative quantity is the type of crosslinking reaction of epoxides and amines. Only if the molar ratio is correctly selected will chemically strongly crosslinked structures be formed that allow particularly high bonding strength to be achieved.

Stabilizer D

In the context of the present invention, the moisture-curing composition can optionally comprise one or a plurality of stabilizers D. In this case, the stabilizer D is preferably selected from water scavengers, amine scavengers, and combinations thereof. By using these stabilizers, the shelf life of the adhesive tape according to the invention can be improved. In this case, the water scavenger is used for the removal of moisture, for example from the air, in particular in the outer packaging of the adhesive tape, which could inadvertently initiate curing of the adhesive tape. Analogously, the amine scavenger is used for the removal of amines that could inadvertently initiate curing of the adhesive tape. The amines to be scavenged can originate for example from the inadvertent unblocking of the blocked amine.

Water Scavengers

Binding of penetrating water can take place physically by adsorption, typically on silica, molecular sieves, zeolites or sodium sulfate. Water can be chemically bound via alkoxysilanes, isocyanates, N-silyl amides, barium oxide, phosphorus pentoxide, alkali and alkaline earth oxides (such as e.g. calcium oxide), metallic calcium or metal hydrides (WO 2004/009720 A2). However, some fillers are not suitable for transparent bonding of glass substrates, for example, because the transparence of the adhesive substance is reduced.

In adhesives, the main substances described as such water scavengers are inorganic fillers such as e.g. calcium chloride or various oxides (cf. U.S. Pat. No. 5,304,419 A, EP 2380930 A1, or U.S. Pat. No. 6,936,131 A). The person having ordinary skill in the art will find many examples of the use of water scavengers in encapsulation of organic electronic devices (e.g. LED, OLED, OPV).

Organic water scavengers are also described in adhesive substances. An example is EP 2597697 A1, in which polymeric alkoxysilanes are used as water scavengers. Numerous different silanes as water scavengers in adhesive substances are mentioned in WO 2014/001005 A1. These can be used according to the invention.

In summary, water scavengers are for example salts such as cobalt chloride, calcium chloride, calcium bromide, lithium chloride, lithium bromide, magnesium chloride, barium perchlorate, magnesium perchlorate, zinc chloride, zinc bromide, silicic acids (for example silica gel), aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate, titanium dioxide, diatomaceous earth, zeolites, phyllosilicates such as montmorillonite and bentonite, metal oxides such as barium oxide, calcium oxide, iron oxide, magnesium oxide, sodium oxide, potassium oxide, strontium oxide, aluminum oxide (activated alumina); further carbon nanotubes, activated carbon, phosphorus pentoxide and silanes; easily oxidizable metals such as e.g. iron, calcium, sodium and magnesium; metal hydrides such as e.g. calcium hydride, barium hydride, strontium hydride, sodium hydride and lithium aluminum hydride; hydroxides such as potassium hydroxide and sodium hydroxide, metal complexes such as e.g. aluminum acetylacetonate; further organic absorbers, for example polyolefin copolymers, polyamide copolymers, PET copolyesters, anhydrides of simple and multiple carboxylic acids such as acetic anhydride, propionic anhydride, butyric anhydride or methyltetrahydrophthalic anhydride, isocyanates or further hybrid-polymer-based absorbers, which are usually used in combination with catalysts such as e.g. cobalt; further organic absorbers such as e.g. weakly crosslinked polyacrylic acid, polyvinyl alcohol, ascorbates, glucose, gallic acid, or unsaturated fats and oils.

In accordance with their function, water scavengers are preferably used in a substantially water-free manner. This distinguishes water scavengers from similar materials used as fillers. For example, silica is often used as a filler in the form of pyrogenic silicic acid. However, if this filler is stored under environmental conditions, which is usually the case, it absorbs water from the environment and is no longer functional as a water scavenger to a technically usable extent. Only silica that is dried or kept dry during storage can be used as a water scavenger. However, it is also possible to use materials that have already been partially complexed with permeates, for example $CaSO_4 * \frac{1}{2} H_2O$ (calcium sulfate hemihydrate) or partially hydrated silicic acids, which by definition are in the form of compounds of the general formula $(SiO_2)_m * nH_2O$.

As described above, silicic acids are understood to refer to compounds having the general formula $(SiO_2)_m * nH_2O$. These are silicon dioxides produced by wet chemical, thermal, or pyrogenic methods. Among the silicic acids, silica gels or amorphous precipitated silicas, for example silica gels impregnated with cobalt compounds as a moisture indicator (blue gel), and pyrogenic silicic acids are particularly suitable water scavengers.

According to a preferred embodiment of the adhesive tape according to the invention, the water scavenger comprises at least one alkoxysilane compound, in particular an alkoxysilane compound carrying a heteroatom or a vinyl group in the α-position.

The water scavenger can for example be used in amounts of 0.1 to 20 wt %, based on the moisture-curing composition, in particular in amounts of 0.5 to 10 wt %.

Amine Scavengers

The amine scavenger is selected in particular from the group of the vinyl carboxylates. Suitable for this purpose are compounds of the following general formula,

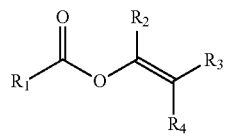

where $R_1$ to $R_4$ denote a hydrogen atom or an organic radical and can be the same or different.

For example, the vinyl carboxylate can be selected from vinyl acetate, vinyl butyrate, vinyl caproate, vinyl caprylate, vinyl caprate, vinyl laurate, vinyl myristate, vinyl palmitate, vinyl stearate, vinyl cyclohexane carboxylate, vinyl octoate, vinyl monochloroacetate, divinyl adipate, vinyl methacrylate, vinyl crotonate, vinyl sorbate, vinyl benzoate, vinyl cinnamate, or combinations thereof.

Also conceivable as amine scavengers are substances that react with amines, such as weak acids that do not initiate cationic polymerization of epoxides, such as e.g. phosphonic acid ($H_3PO_3$) or phosphinic acid ($H_3PO_2$); or isocyanates (—NCO), thiocyanates (—SCN), isothiocyanates (—NCS), acid halides, in particular acid chlorides, anhydrides, in particular isatoic anhydride and succinic acid anhydrides, alkyl halides, in particular benzyl halides, ketones, in particular activated ketones such as e.g. β-diketones, aldehydes, in particular benzaldehydes, sulfonyl chlorides, and vinyl carboxylates.

Preferably, polymer-supported amine scavengers that can comprise the above-mentioned chemical groups can also be used, such as those marketed e.g. by Sigma-Aldrich or Rapp Polymere.

For adhesive tapes with high layer thicknesses, one can also use particulate amine scavengers in which the reactive groups are bound to silica. Preferably, the particles are preferably 100 μm or less in size.

The amine scavenger can for example be used in amounts of 0.01 to 10 wt %, based on the moisture-curing composition, in particular 0.1 to 5 wt %.

According to a particularly preferred embodiment of the adhesive tape according to the invention, the amount of blocked amine used is selected such that there is a 0.95 to 1.5-fold molar amount, and in particular a 0.98 to 1.2-fold molar amount, of amine hydrogens of the released amine per molar amount of the epoxide groups of the epoxide component B, or, if an amine scavenger is present, per molar sum of the epoxide groups of the epoxide component B and the amine scavenger groups of the amine scavenger. The reason for this relative quantity is that due to the optional use of amine scavengers, a portion of the amine hydrogens is scavenged and is then no longer available for the moisture curing. Amine scavengers are advantageously used, because in the production of adhesive tapes, in contrast to liquid adhesives, it is not possible without great effort to eliminate all moisture, with the result that even small amounts of amines may react with epoxides, which can negatively affect adhesive properties in an uncured state.

Additive E

Suitable as the additive E are all additives for adhesive tapes and pressure-sensitive adhesive substances known to the person having ordinary skill in the art, such as e.g. accelerators, adhesive resins, so-called tackifiers, rheology modifiers, foaming agents, fillers, adhesion promoters, polyols, anti-aging agents, light stabilizers, dyes, impact modifiers, phenoxy resins, or mixtures thereof.

Although adhesive resins can be used for the present invention, an adhesive resin is not required for the adhesive substances of the present invention. The desired tackiness of the adhesive substance is also achieved without adding an adhesive resin.

If adhesive resins are used, suitable for this purpose are adhesive resins such as those known to the person having ordinary skill in the art, for example from Satas. In this case, the pressure-sensitive adhesive substance can comprise at least one type of a preferably at least partially hydrogenated adhesive resin, e.g. those that are compatible with the elastomer component, or if a copolymer composed of hard and soft blocks is used, chiefly compatible with the soft block (soft resins).

A corresponding adhesive resin can have a softening temperature, measured by the ring and ball method, of greater than 25° C., and can additionally comprise at least one type of adhesive resin with a softening temperature of less than 20° C. In this manner, if necessary, the adhesive behavior on the one hand and the flow behavior on the bonding substrate on the other can be fine-tuned.

For more nonpolar elastomers, partially or fully hydrogenated resins based on colophony and colophony derivatives, hydrogenated polymers of dicyclopentadiene, partially, selectively, or fully hydrogenated hydrocarbon resins based on $C_5$, $C_5/C_9$ or $C_9$ monomer streams, polyterpene resins based on α-pinene and/or β-pinene and/or 6-limonene and/or $\Delta^3$-carene, and hydrogenated polymers of preferably pure C8 and C9 aromatics can be used as resins in the pressure-sensitive adhesive substance. The above-mentioned resins may be used both alone and in mixtures.

In this case, both resins that are solid and those that are liquid at room temperature may be used. In order to ensure a high degree of aging stability and UV stability, hydrogenated resins with a degree of hydrogenation of at least 90%, and preferably at least 95%, are preferred.

As fillers, for example, chalks, kaolins, and silicates may be used. Suitable thixotropic fillers are aerosil and Soccal chalks.

The following can typically be used as further additives:
plasticizers such as e.g. plasticizing oils or low molecular weight liquid polymers, such as e.g. low molecular weight polybutenes, preferably with a content of 0.2 to 5 wt % based on the total weight of the pressure-sensitive adhesive substance primary antioxidants such as e.g. sterically hindered phenols, preferably with a content of 0.2 to 1 wt % based on the total weight of the pressure-sensitive adhesive substance secondary antioxidants, such as e.g. phosphates or thioethers,
preferably with a content of 0.2 to 1 wt % based on the total weight of the pressure-sensitive adhesive substance process stabilizers such as e.g. C radical scavengers,
preferably with a content of 0.2 to 1 wt % based on the total weight of the pressure-sensitive adhesive substance processing auxiliaries,
preferably with a content of 0.2 to 1 wt % based on the total weight of the pressure-sensitive adhesive substance
end block reinforcer resins,
preferably with a content of 0.2 to 10 wt % based on the total weight of the pressure-sensitive adhesive substance and
optionally, further polymers, preferably of the elastomeric type; among others, correspondingly usable elastomers include those based on pure hydrocarbons, for example unsaturated polydienes such as naturally or synthetically produced polyisoprene or polybutadiene, elastomers that chemically are substantially saturated such as e.g. saturated ethylene-propylene copolymers, α-olefin copolymers, polyisobutylene, butyl rubber, ethylene-propylene rubber, and chemically functionalized hydrocarbons such as e.g. halogen-containing, acrylate-containing, allyl- or vinyl ether-containing polyolefins, preferably with a content of 0.2 to 10 wt % based on the total weight of the pressure-sensitive adhesive substance.

In a particularly preferred embodiment of the adhesive tape according to the invention, the additive E comprises at least one accelerator that is selected in particular from alcohols, alkoxysilanes, blocked acids, preferably silyl carboxylates, and combinations thereof.

The amount of the accelerator used is preferably 0.1 to 10 wt %, in particular 0.5 to 5 wt %, and preferably 1 to 3 wt %, based in each case on the epoxide component B.

According to the invention, the moisture-curing composition optionally comprises 0.1 to 200 parts by weight, in particular 50 to 150 parts by weight, and preferably 10 to 100 parts by weight of at least one additive E.

A particularly preferred adhesive tape according to the invention is characterized in that the moisture-curing composition comprises or is composed of
A 10 to 50 parts by weight of the at least one film-forming component and/or
B 50 to 90 parts by weight of the at least one epoxide component and/or
C 5 to 250 parts by weight of the blocked amine and/or
D 0.1 to 15 parts by weight of the at least one stabilizer and/or
E 0.1 to 200 parts by weight of the at least one additive,
wherein the parts by weight of components A and B total 100 and wherein the amount of blocked amine used is selected such that there is a 0.95 to 1.5-fold molar amount, and in particular a 0.98 to 1.2-fold molar amount, of amine hydrogens of the released amine per molar amount of the epoxide groups of the epoxide component B, or, if an amine scavenger is present in component D, per molar sum of the epoxide groups of the epoxide component B and the amine scavenger groups of the amine scavenger.

Preferably, the adhesive tape according to the invention can be repositioned in air with 50% relative humidity at 23° C. for at least 30 min, preferably at least 4 h, further preferably at least 8 h, even more preferably at least 12 h, and in particular 12 to 24 h. Particularly preferably, it can be repositioned in air with 50% rel. humidity at 23° C. for no longer than 24 h.

A further subject matter of the present invention relates to a method for assembling two components by means of an adhesive tape according to the invention, wherein the method is characterized in that the adhesive tape is applied to the first component and brought into contact with moisture, in particular air having a relative humidity of at least 15%, in order to activate the curing.

The adhesive tapes according to the invention can be used for example on the assembly line in the automotive industry or in the electronics industry, for example for bonding in cellular phones or tablets. In the event of incorrect positioning, it is then possible to correct the bonding within the above-mentioned periods of time.

The adhesive tape according to the invention can be configured in all of the usual forms, for example as rollstock, punched blanks, tape sections and the like. The adhesive tape is preferably sold in sealed, metal-coated packages, for example in aluminum-coated film packages. These can be vacuum-packed or filled with a protective gas.

The present invention is explained in further detail below by means of examples.

Examples

Adhesive Strength:
Adhesive strengths on steel were determined analogously to ISO 29862 (Method 3) at 23° C. and 50% relative humidity with a peel rate of 300 mm/min and a peel angle of 180°. As a reinforcing film, an etched PET film having a thickness of 36 μm, such as that available from the firm Coveme (Italy), was used. In this case, bonding of the measuring strip was carried out using a bending rolls machine at a temperature of 23° C. The adhesive tapes were peeled off immediately after application. The measurement value (in N/cm) was determined as the mean value of three individual measurements.

Bonding Strength—Pull Shear Test:
As a parameter for the quality of the bonding achieved, the bonding strength of a bond produced according to the method of the invention was determined for the various adhesive tapes. For this purpose, bonding strength was quantitatively determined in a dynamic pull shear test according to DIN-EN 1465 at 23° C. and 50% relative humidity (RH) for a test rate of 10 mm/min in each case (results in $N/mm^2$=MPa). Steel rods that were cleaned with acetone prior to bonding were used as test rods. The respective layer thicknesses of the adhesive tapes corresponded to the above indications. The value indicated is the mean value of three measurements.

Repositionability:
In order to determine repositionability, a 10 cm×2 cm wide strip of the adhesive tape to be tested was provided with a reinforcing film such as e.g. aluminum or etched PET and then applied to a steel plate cleaned with acetone at 23±1° C./50±5% RH. The strips were rolled over with a 4 kg roller at approx. 10 cm/s (5 times back and forth). After 8 h, the adhering strips were manually peeled off the adhesive base at approx. 10 cm/s at an angle of approx. 135°. Assessment was conducted visually. The amount of residue formation in % of the adhesion surface was assessed. Grading was carried out according to the following table:

| Grade | Adhesive residue in % of adhesion surface |
| --- | --- |
| 1 | no residue |
| 2 | isolated adhesive points <10 |
| 3 | 10-30 |
| 4 | 31-50 |
| 5 | 51-100 |

For assessment purposes, the shear strength after repositioning was also measured. For this purpose, an adhesive tape was applied at 23° C./50% RH, repositioned after 24 h, and allowed to cure for 30 d at 23° C./50% RH.

Raw Materials Used:

| | |
|---|---|
| Desmomelt 530 | Largely linear hydroxyl polyurethane. Desmomelt 530 is a strongly crystallizing, elastic polyurethane of extremely low thermoplasticity from the firm Bayer MaterialScience. |
| Epon Resin 828 | Difunctional bisphenol A/epichlorohydrin liquid epoxide with a weight per epoxide of 185-192 g/eq from the firm Momentive. |
| PolyDis PD3611 | Nitrile rubber-modified epoxide resin based on bisphenol F-diglycidyl ether with an elastomer content of 40% and a weight per epoxide of 550 g/eq from the firm Schill + Seilacher "Struktol." |
| Tactix 556 | Dicyclopentadiene-epoxy-novolac resin with a weight per epoxide of 215-235 g/eq and a softening point of 53° C. from the firm Huntsman. |
| Incozol 4 | Bis-oxazolidine for curing of isocyanate prepolymers (bis[2-[2-(1-methylethyl)-3-oxazolidinyl]ethyl]hexane-1,2-diylbiscarbamate). |
| Incozol BH | Latent aldimine for curing of isocyanates (N,N-dibenzylidene polyoxypropylene diamine (polymer)). |
| Vinyl acetate | Stabilizer, reacts with amines under cleavage of vinyl alcohol (CAS: 108-05-4) |
| Trimethylsilyl acetate | Accelerator for aldimine/ketimine decomposition. Releases acetic acid after reaction with water (CAS: 2754-27-0). |
| Calcium oxide | Water scavenger (CAS: 1305-78-8) |
| Vinyl trimethoxysilane | Water scavenger (CAS: 2768-02-7) |

| | Example: | | | | | | | |
|---|---|---|---|---|---|---|---|---|
| | K1 Pts by wt | K2 Pts by wt | K3 Pts by wt | K4 Pts by wt | K5 Pts by wt | K6 Pts by wt | V1 Pts by wt | V2 Pts by wt |
| Desmomelt 530 | 40 | 23 | 23 | 23 | 23 | 23 | 40 | |
| Epon Resin 828 | 60 | | | | | | 60 | 60 |
| PolyDis PD3611 | | 45 | 45 | 45 | 45 | 45 | | |
| Tactix 556 | | 14 | 14 | 14 | 14 | 14 | | |
| Incozol 4 | 39 | 17 | 17 | 18.5 | | | | 39 |
| Incozol BH | | | | | 17 | 17 | | |
| Vinyl trimethoxysilane | | — | 1 | 1 | | 1 | | |
| Vinyl acetate | | | | 0.5 | | | | |
| Trimethylsilyl acetate | | | | | | 0.5 | | |
| CaO | 5 | 5 | 5 | | 5 | 5 | 5 | 5 |

Adhesive tapes were produced from the adhesive substances K1-K6 and V1 as follows:

Production of the pressure-sensitive adhesive substances was carried out in the laboratory by dissolving the film-former in dried butanone at 23° C. The reactive resin(s) was/were then added. The stabilizers (water scavengers and amine scavengers) were added under agitation. The curing agent was added last.

In order to produce adhesive substance layers, the various adhesive substances were applied from a solution to a conventional liner (siliconized polyester film) by means of a laboratory application device at 23° C./50% RH and dried. The adhesive substance layer thickness after drying was 100±10 μm. Drying was carried out in each case first at RT for 10 min and then for 10 min at 105° C. in a laboratory drying cabinet. The respective dried adhesive substance layers were laminated on the open side immediately after drying with a second liner (siliconized polyester film with low separating force).

The properties of the adhesive tapes according to the invention with the pressure-sensitive adhesive substances K1 to K5 and the comparison adhesive substances V1 and V2 are summarized in the following table:

| | Example: | | | | | | | |
|---|---|---|---|---|---|---|---|---|
| | K1 | K2 | K3 | K4 | K5 | K6 | V1 | V2 |
| Adhesive strength (N/cm) fresh | 3.2 | 9.8 | 8.3 | 7.9 | 5.6 | 5.5 | 3.4 | not measurable |
| Shear strength (MPa) after 30 d at 23° C./50% RH | 11.6 | 7.4 | 9.1 | 8.6 | 2.1 | 3.9 | 0.1 | 9.3 |
| Repositionability | 1 | 1 | 1 | 1 | 1 | 1 | 2 | 5 |
| Shear strength after repositioning (MPa) | 10.9 | 8.1 | 9.4 | 8.9 | 2.6 | 3.7 | 0.1 | — |

In an uncured state, the adhesive tapes according to the invention with adhesive substances K1-K5 showed (fresh) adhesive forces greater than 1 N/cm. At the same time, the bonding strengths after curing (30 d, 23° C., 50% RH) increased to over 2 MPa. It was found in this case that in use of oxazolidine curing agents (K2 and K3), the addition of water scavengers (calcium oxide and vinyl trimethoxysilane) increased shelf life on the one hand, and at the same time, in the case of vinyl trimethoxysilane, accelerated or improved curing due to the alcohols released by moisture on the other (slightly increased shear strengths).

Although adhesive tapes can be produced without the latent curing agents according to the invention, they are not moisture-curing over time (V1). Typical liquid moisture-curing epoxide adhesives (described for example in U.S. Pat. No. 6,803,445B2) do undergo moisture curing, but do not yield adhesive tapes (V2).

In order to improve storage times or control the period of time during which the adhesive tape can be repositioned in the presence of moisture, one can further add amine scavengers. A comparison of K3 and K4 shows that the addition of vinyl acetate has no negative effects on adhesive properties. The only point to be borne in mind in these cases is that the amine scavenger binds reactive amine hydrogens of the blocked amine, and one must therefore add an increased amount of blocked amine corresponding to the amount of the amine scavenger.

Moisture-curing adhesive tapes can also be produced using aldimines as latent curing agents (K5-K6). In this case, it has been found to be advantageous to add a moisture-latent acid (trimethylsilyl acetate). On the one hand, the storage duration is thus increased, as penetrating water is scavenged. On the other, the released acid catalyzes the aldimine-water reaction, which leads to improved shear strengths.

The invention claimed is:

1. A pressure-sensitive adhesive tape, comprising a moisture-curing composition, the moisture-curing composition comprising:
   (A) 5 to 60 parts by weight of at least one film-forming component selected from the group consisting of nitrile rubber, synthetic rubber, natural rubber, polyurethanes, and mixtures thereof;
   (B) 40 to 95 parts by weight of at least one epoxide component;
   (C) 10 to 500 parts by weight of at least one moisture-activatable curing agent;
   (D) optionally, 0.1 to 15 parts by weight of at least one stabilizer; and
   (E) optionally, 0.1 to 200 parts by weight of at least one additive,
   based in each case on the moisture-curing composition, wherein the parts by weight of components (A) and (B) total 100,
   wherein
   the at least one moisture-activatable curing agent (C) comprises of at least one blocked amine.

2. The pressure-sensitive adhesive tape of claim 1, wherein the at least one film forming component (A) is not intrinsically pressure-sensitive.

3. The pressure-sensitive adhesive tape of claim 1, wherein the at least one epoxide component (B) contains at least 10 wt % at 25° C. of liquid epoxide resins, based on the at least one epoxide component (B).

4. The pressure-sensitive adhesive tape of claim 1, wherein the at least one blocked amine is one that releases an amine in the presence of water.

5. The pressure-sensitive adhesive tape of claim 1, wherein the at least one blocked amine is one that, after complete reaction with water in an unblocked state, contains at least two amine hydrogen atoms.

6. The pressure-sensitive adhesive tape of claim 1, wherein the at least one blocked amine is selected from the group consisting of oxazolidines, imines, enamines, silyl amines, and combinations thereof.

7. The pressure-sensitive adhesive tape of claim 6, wherein the at least one blocked amine contains at least two oxazolidine groups.

8. The pressure-sensitive adhesive tape of claim 1, wherein the amount of the at least one blocked amine used is selected such that there are 0.95-1.5 amine hydrogens of the released amine per epoxide group of the at least one epoxide component (B).

9. The pressure-sensitive adhesive tape of claim 1, wherein the at least one stabilizer (D) is selected from water scavengers, amine scavengers, and combinations thereof.

10. The pressure-sensitive adhesive tape of claim 9, wherein the water scavenger comprises at least one alkoxysilane compound and/or the amine scavenger is selected from the group of vinyl carboxylates.

11. The pressure-sensitive adhesive tape of claim 10, wherein the alkoxysilane compound carries a heteroatom or a vinyl group in the α position.

12. The pressure-sensitive adhesive tape of claim 1, wherein the amount of the at least one blocked amine used is selected such that there is a 0.95 to 1.5-fold molar amount, of amine hydrogens of the released amine per molar amount of the epoxide groups of the at least one epoxide component (B), or, if an amine scavenger is present, per molar sum of the epoxide groups of the at least one epoxide component (B) and the amine scavenger groups of the amine scavenger.

13. The pressure-sensitive adhesive tape of claim 12, wherein the amount of the at least one blocked amine used is selected such that there is a 0.98 to 1.2-fold molar amount, of amine hydrogens of the released amine per molar amount of the epoxide groups of the at least one epoxide component (B), or, if an amine scavenger is present, per molar sum of the epoxide groups of the at least one epoxide component (B) and the amine scavenger groups of the amine scavenger.

14. The pressure-sensitive adhesive tape of claim 1, wherein the at least one additive (E) comprises at least one accelerator that is selected from alcohols, blocked acids, and combinations thereof.

15. The pressure-sensitive adhesive tape of claim 1, wherein the moisture-curing composition comprises:
   (A) 10 to 50 parts by weight of the at least one film-forming component;
   (B) 50 to 90 parts by weight of the at least one epoxide component;
   (D) 0.1 to 15 parts by weight of the at least one stabilizer; and
   (E) 0.1 to 200 parts by weight of the at least one additive,
   wherein the parts by weight of components (A) and (B) total 100 and wherein the amount of the at least one blocked amine used is 5 to 250 parts by weight and selected such that there is a 0.95 to 1.5-fold molar amount, of amine hydrogens of the released amine per molar amount of the epoxide groups of the at least one epoxide component (B), or, if an amine scavenger is present in component (D), per molar sum of the epoxide groups of the at least one epoxide component (B) and the amine scavenger groups of the amine scavenger.

16. The pressure-sensitive adhesive tape of claim 15, wherein the amount of the at least one blocked amine used is selected such that there is a 0.98 to 1.2-fold molar amount, of amine hydrogens of the released amine per molar amount of the epoxide groups of the at least one epoxide component (B), or, if an amine scavenger is present in component (D), per molar sum of the epoxide groups of the at least one epoxide component B and the amine scavenger groups of the amine scavenger.

17. The pressure-sensitive adhesive tape of claim 1, wherein the adhesive tape is repositionable in air with 50% relative humidity at 23° C. for at least 12 hours.

18. A method for assembling two components by means of the pressure-sensitive adhesive tape of claim 1, wherein the adhesive tape is applied to the first component and then brought into contact with moisture, in order to activate the curing.

* * * * *